APPARATUS FOR THE PRODUCTION OF CODED INTELLIGENCE ON A RECORD MEDIUM

Original Filed April 21, 1969 2 Sheets-Sheet 1

INVENTORS
FRANK G. HIGGASON JR.
ROBERT J. SEHNERT

Anderson, Luedeka, Fitch, Even & Tabin
ATTYS.

INVENTORS
FRANK G. HIGGASON JR.
ROBERT J. SEHNERT

Anderson, Luedeka, Fitch, Even & Tabin
ATTYS.

United States Patent Office 3,664,577

Patented May 23, 1972

3,664,577

APPARATUS FOR THE PRODUCTION OF CODED INTELLIGENCE ON A RECORD MEDIUM

Frank G. Higgason, Jr., Arlington Heights, and Robert J. Sehnert, Palatine, Ill., assignors to Ludlow Typograph Company, Chicago, Ill.

Original application Apr. 21, 1969, Ser. No. 817,987, now Patent No. 3,580,494, dated May 25, 1971. Divided and this application Aug. 5, 1970, Ser. No. 61,344

Int. Cl. G06k 1/02

U.S. Cl. 234—15 1 Claim

ABSTRACT OF THE DISCLOSURE

Apparatus produces coded intelligence on a record medium, such as by perforating a moving tape, and has a keyboard input. An error correction capability is provided which utilizes the input data, itself, such as the word spaces, to control the operation of the system for deletion of the unwanted data on the medium. A computer word program capability may also be provided for producing selected multi-character instruction codes on the medium from a single key at the keyboard.

This is a division of Ser. No. 817,987, filed Apr. 21, 1969, and now Pat. No. 3,580,494, issued May 25, 1971.

The present invention generally relates to apparatus for the production of coded intelligence on a record medium adapted for movement in either a forward or reverse direction with respect to an indicia marking head placed in operative relation to the medium for providing character and function codes thereon for directing the composing of type or the like. More particularly, the present invention relates to such apparatus utilizing a keyboard input and having an error correction capability which will automatically provide deletion or "rubout" indicia codes over the erroneous or unwanted codes on the moving medium. A further aspect of the invention relates to such apparatus which may include a system for providing a programmed output on the medium from a single command signal input at the keyboard for performing certain desired functions in a typesetting operation wherein word instructions or a plurality of individual pre-ordered subfunctions are required, or wherein the function code information content exceeds the code level of the marking head and medium in normal operation.

The present embodiment of the invention is described in connection with the production of coded intelligence for the eventual control of typesetting operations for printing wherein such intelligence is recorded on a perforated or punched paper tape, or other record medium. The perforated tape is then later used to control the setting of the type for printing purposes in a well known manner. However, the invention could also be used for other purposes, such as for the production of program tapes used to control certain machine tools or other equipment and apparatus of various types.

The apparatus in accordance with the present embodiment of the invention involves a non-justifying tape perforating system having an error correction capability and a programmed function output capability, both controlled in a convenient and efficient manner from the system keyboard and its associated controls.

In the use of keyboard input tape perforating systems, as heretofore known, it is, of course, a desideratum that the operator be permitted to operate the keyboard at maximum speed with the greatest accuracy. However, when an error occurs or unwanted data is typed, its deletion and correction on the tape may cause undue delays and inconvenience in the composing operation. Accordingly, it is an object of the present invention to provide improved apparatus wherein errors which might be made by the operator in typing on the keyboard may be rapidly corrected on the record medium in an automatic fashion, after which the apparatus is then restored to a condition to receive further information from the operator. At the same time, it is an object of the invention to provide such apparatus having the greatest reliability with a minimum of complexity and relatively good economy of manufacture.

It is a further object of the invention to provide an improved system for producing a pre-ordered sequence of code indicia on the tape for selection of a word program corresponding to a desired operational function of the utilization apparatus by merely depressing a single key associated with the keyboard, and thereby effecting a substantial increase in the possible operator speed of the apparatus, each data or character code of the word program being properly transmitted in rapid succession by high speed digital components. This also effectively reduces the number of necessary keys at the keyboard for any given number of functions while providing an output code on the tape that is compatible with the typical reader on the typesetting or other utilization apparatus having a given level code capacity.

These and other objects of the invention are more particularly set forth in the following description and in the accompanying drawings of which:

Figure 1:
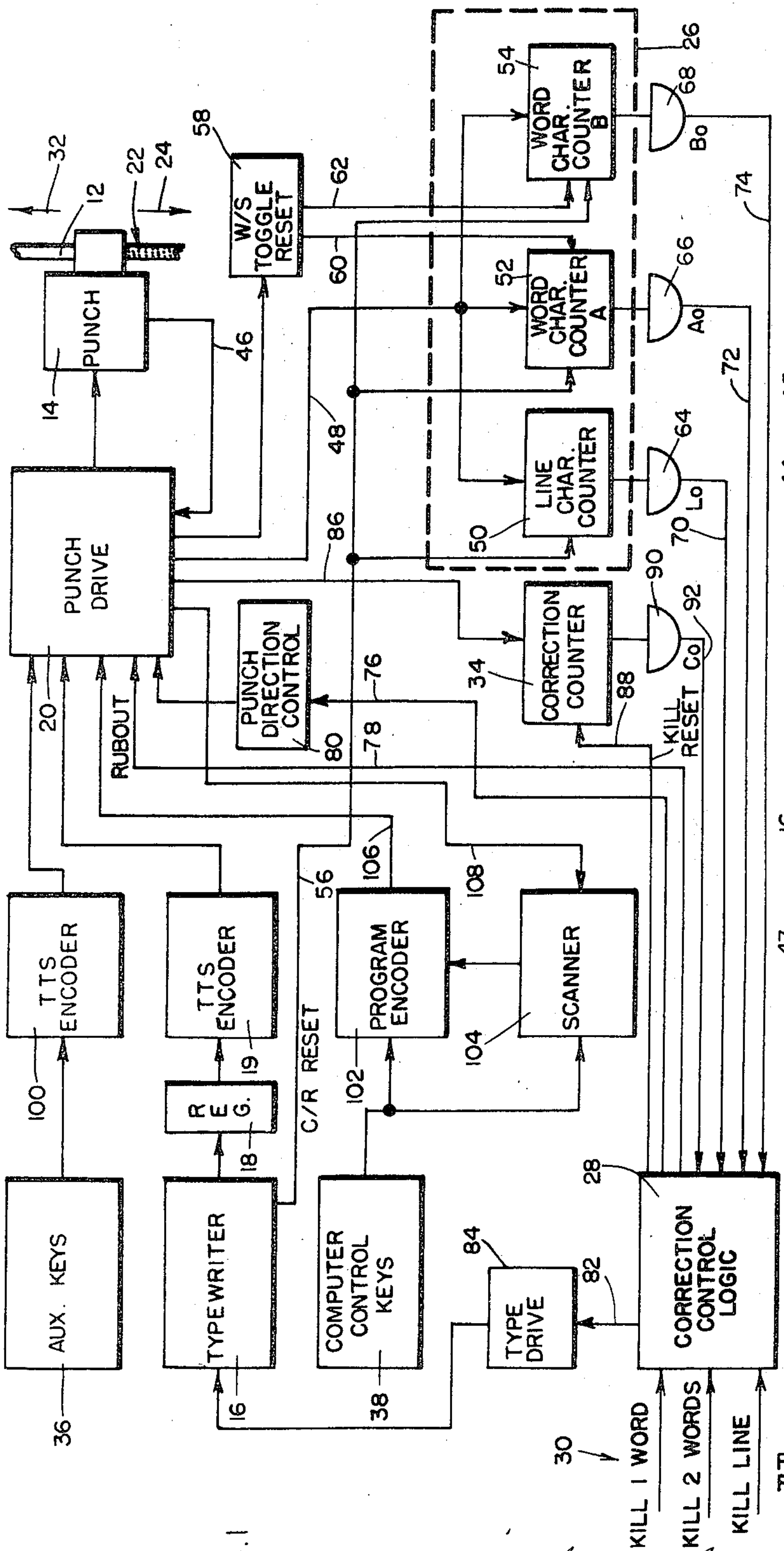
FIG. 1 is a block diagram showing a preferred embodiment of the system of an apparatus in accordance with the present invention.

Referring now to FIG. 1, there is generally shown a system for placing coded intelligence on a record medium, such as a paper tape or strip 12 which may be fed in either a forward or reverse direction with respect to a marking head or punch unit 14 through which it is fed. The punch unit 14 has associated therewith controllable paper feeding and paper perforating mechanisms of conventional type. The system comprises character selecting means, such as a typewriter 16, for generating data code signals corresponding to selected characters and spaces, and circuit means including a register 18, encoder 19 and drive circuits 20, responsive to these code signals for causing the punch unit 14 to place indicia codes 22 corresponding to the selected characters and spaces in succession along the tape as it is fed in its forward direction, as indicated, for example, by arrow 24. As used herein, the term "data codes" includes all character and function codes and the space code. The character codes correspond to the various typewriter character keys, and the space code corresponds to the space bar or carriage return key, the carriage return being encoded and punched as a space code since the actual line lengths in the eventual printed copy are determined by the typesetting apparatus into which the perforated tape is to be fed rather than by the presently illustrated apparatus.

Error correction means is provided which comprises counting means 26 for registering the number of data codes 22 punched in the tape from certain selected preceding space codes during the forward stepping tape movement through the punch 14 and logic means 28 responsive to correction command input signals, illustrated generally as 30, for causing the tape feeding mechanism associated with the punch unit 14 to move the tape in a reverse direction, as indicated, for example, by the arrow 32. The reverse feeding of the tape continues with the counting means 26 counting backward until it reaches zero, at which time the particular selected space code at which the counting was initiated arrives at the punch 14. This zero count, in the form of a suitable electrical signal, causes the tape feed mechanism of the punch to then feed the tape in the forward direction and simultaneously causes the punch 14 to punch deletion or rubout indicia codes over the unwanted data codes on the tape by means of suitable logic and control circuitry. However, as the tape steps in its reverse direction and the counting means 26 counts down to zero, a further counting means, illustrated as correction counter 34, registers each data code (or data code interval) passing the punch head in the reverse tape direction. Thus, on the occurrence of the zero-count of counting means 26, the correction counter 34 contains the total data code count from the point on the tape where the correction command signal occurred to the particular space code at which the counting means 26 commenced its count. Consequently, as the tape is fed forwardly during the rubout operation, the correction counter 34 counts down to zero. This correction zero-count, in the form of a suitable electrical signal, causes the tape-feed mechanism of the punch to stop the tape, and the apparatus is now ready to accept further data from the operator. During the deletion cycle the keyboard is automatically locked by suitable means to prevent any other data from being applied during this period.

Thus, by a single error command signal initiated by the operator, the apparatus automatically moves the medium back to a prescribed point related only to the information content on the tape, such as a particular preceding space code, and then the tape is fed in its forward direction and a rubout code is punched over each of the data indicia codes until the tape reaches its original or initial position at which the error command was initiated. The operator may then type the correct or desired data, and the tape will continue to be fed in its forward direction.

In the illustrated embodiment, the operator may choose between three different correction command input signals 30 providing three modes of operation. These are "kill 1 word," "kill 2 words" and "kill line." In the "kill 1 word" mode, the particular selected preceding space-code, previously mentioned, is the last word-space which occurred prior to this correction command input. In the "kill 2 words" mode, the particular selected preceding space-code is the next to the last or penultimate word space which occurred prior to this correction command input. In the "kill line" mode, the particular selected preceding space-code is the last carriage-return which occurred prior to this correction command input.

In addition to the typewriter 16 input data, the illustrated apparatus includes auxiliary keys 36 which provide for various functions employed in typesetting, and computer control keys 38 which provide for various instruction word programs, i.e., functions requiring more than one function code or punch interval on the tape.

Figure 2:
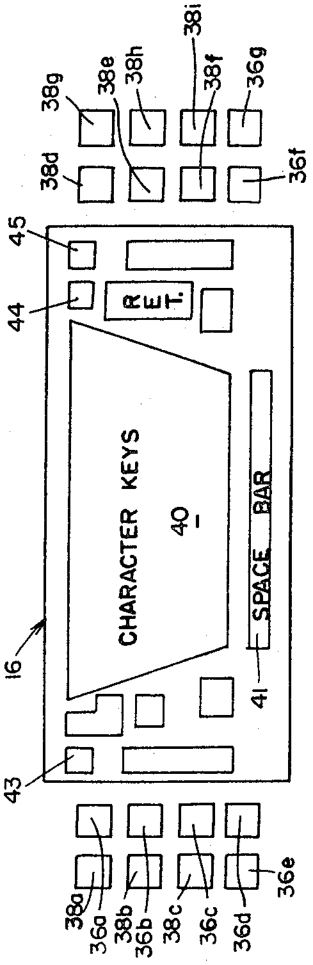
FIG. 2 is a diagram showing a typical keyboard layout that may be used in the apparatus of FIG. 1.

One example of a suitable keyboard layout is shown in FIG. 2. The typewriter 16 contains the usual character keyboard 40, space bar 41, and carriage return key 42, as well as the other standard keys which, in the present usage, may be utilized for various composing or typesetting functions. The "kill 1 word" key is illustrated as 43, while the "kill 2 words" and "kill line" keys are illustrated as 44 and 45, respectively. The auxiliary keys 36 of FIG. 1 are illustrated in FIG. 2 as seven keys **36*a* through 36g, corresponding respectively to the following functions: Tape Feed, EM Space, EN Space, EM Leader, EN Leader, Thin and Stop. All of these auxiliary keys, with the exception of Tape Feed, when depressed, will enter their corresponding codes on the tape. The Tape Feed key 36*a* provides a means of advancing the tape through the punch 14 while punching only sprocket holes. A duplicate or remote Tape Feed button may also be provided on the housing of the punch 14** to facilitate tape loading.

The computer control keys 38 of FIG. 1 are illustrated in FIG. 2 as nine keys **38*a* through 38*i*** and provide a means of entering on the tape computer instruction commands or programs of up to 10 characters in length. These keys select pre-wired programmed codes from suitable plug-in printed circuit diode matrices which may contain unique programs fitting the requirements of each particular installation.

Although FIG. 2 illustrates a keyboard layout employed with the present apparatus, other layouts may of course be employed as desired.

More specifically, the typewriter 16 may desirably be a modified IBM Selectric typewriter which provides a six level IBM code output corresponding to the particular key which is depressed. The IBM code for the key is stored in input register 18, and the register output is fed to a TTS encoder 19 which converts the IBM code to the TTS or Teletypesetter code which is compatible with conventional typesetting equipment and normally used therewith. The TTS code from the encoder 19, corresponding to the particular typewriter key depressed, is gated to punch drive circuit 20 which, in turn, controls the punch unit 14 for perforating the corresponding six level TTS code indicia in the paper tape or strip 12 and for feeding the tape therthrough in a stepping movement. The punch unit 14 may be a Royal tape perforator or one of any other suitable conventional type.

The punch unit 14 includes a constant speed motor (not shown) which powers the tape feeding mechanism and generates a clock pulse signal on lead 46 which is fed back to the punch drive circuit 20. The clock pulses occur in synchronism with the data or punch intervals on the tape 12. The punch intervals on the tape are defined by the amount of tape which is advanced between each row of punches, i.e., the distance between successive points on the tape positioned in operative relation to the punch head. Thus, a clock pulse is produced by the punch unit 14 on lead 46 each time a code is placed on the tape, as well as when only sprocket holes are being punched, and regardless of whether the tape 12 is being moved in its forward or reverse direction. The punch drive circuit 20 is responsive to these clock pulses and supplies a synchronized output pulse via line 48 to the counting means 26 when the tape moves through each punch interval.

The counting means 26 comprises a line character counter 50 and two word character counters, A and B, designated as 52 and 54, respectively. The line character counter 50 registers the number of data codes punched on the tape from the beginning of each line, i.e., from the preceding carriage return which is indicative of the beginning of a typewriter line. The word character counter A, designated as 52, and the word character counter B, designated as 54, both register the number of data codes punched on the tape from selected word space codes in a manner to be hereinafter described. The word character counters 52 and 54 enable the system to automatically kill either one or two words, as desired, and return to its ready condition to receive new or correct data information.

More specifically, the counters 50, 52 and 54 are of the forward-backward type, and are stepped in their forward direction each time a data code is punched on the tape when the tape is moved in its forward direction. The counters are stepped in their backward direction when the tape is moved in its reverse direction. Thus, each counter adds one count with each forward data or punch interval and subtracts one count with each reverse punch interval. The forward-backward counting action of the counters 50, 52, and 54 is determined by the pulse signals on line 48 which are synchronized with the movement of the tape 12. Although only a single line 48 is shown for the purpose of clarity of illustration in the block diagram, it is of course understood that various separate leads may be employed in the actual apparatus construction for effecting proper forward and backward counting operations with the respective forward and reverse tape movements, as is well known to the art.

A carriage return reset signal is supplied from the typewriter 16 via line 56 to each of the character counters 50, 52, and 54 to reset them each time the carriage return key 42 is depressed and the typewriter begins a new line.

Toggle reset circuit 58 is responsive to the occurrence of each and every word-space code from the punch drive circuit 20 and supplies a reset output pulse alternately to the A and B word character counters 52 and 54 via output lines 60 and 62 on the occurrence of each word-space or carriage return. Thus, on each depression of the space bar 41 or the carriage return key 42, the word character counters A and B are alternately reset so that one of the counters always contains the total data count for the last preceding two words while the other always contains the total data count for the last preceding word. On the occurrence of each word space, the particular counter containing the two-word count is reset to begin a new count while the other counter which contains only the last word count continues to register data codes until the next word space or carriage return resets it to zero. In the present embodiment of the apparatus, the line character counter 50 is preferably a 7 bit forward-backward counter, while the word character counters 52 and 54 are preferably 6 bit forward-backward counters, all of them being of conventional types well known in the art.

Each of the counters 50, 52 and 54 have their outputs coupled to zero detectors 64, 66 and 68, respectively, which provide respective output signals on lines 70, 72 and 74 to the control logic 28 whenever any of the counters count down and reach zero. That is, the zero detectors 64, 66 and 68 provide output signals when and only when their respective counters count backward from some number count and reach zero, and they provide no signal for any other condition. It is to be understood, of course, that the "zero-count" of the system may arbitrarily be chosen to be any particular number, and would normally be chosen from considerations based primarily on the convenience of use with the particular circuitry or number system employed.

Each of the zero-count signals on leads 70, 72 and 74 are fed to the correction control logic 28 which provides suitable signal output on lines 76 and 78 for ultimately determining the operation of the punch unit 14 through a punch direction control circuit 80 and the punch drive circuit 20. The direction of tape feed and the punching of rubout codes are thus controlled by these outputs from the correction control logic 28. Additionally, the correction control logic 28 provides a further output on lead 82 for controlling certain operations on the typewriter 16, such as the slash and carriage return, through typewriter drive circuit 84. A suitable keyboard locking signal is also provided, although not shown. The typewriter is actuated for typing a slash on the hardcopy to designate the occurrence of any of the correction modes, and the carriage return is actuated after a "kill line" mode, whereby a space code is perforated on the tape. In every instance, upon depressing the carriage return key 42 of the typewriter, the carriage is returned to the beginning of the next line and a TTS space code is placed on the tape. The same occurs when the carriage retrun is actuated by the control logic 28.

The correction counter 34, like the other counters, is responsive to each data code interval on the tape as it moves through the punch, but normally counts in the backward direction whenever the tape is fed in its forward direction, and counts in its forward direction whenever the tape is fed in its reverse direction. The correction counter 34 is driven by the punch drive 20, via line 86, in the same manner as character counters 50, 52 and 54. The correction counter 34 is reset to zero by a kill reset signal supplied from the correction control logic 28, via line 88, on the occurrence of any of the error correction commands 30 so that the correction counter 34 will always have a zero-count when an error correction command is initiated by depression of any of keys 43, 44 or

45. The output of the correction counter 30 is supplied to a zero detector 90 which supplies an output signal on lead 92 whenever the correction counter counts down to, and reaches, zero, the operation being similar to the other zero detectors 64, 66 and 68 previously discussed. The correction zero-count signal on lead 92 is supplied to the correction control logic 28 for effecting system operation in the manner now to be described in greater detail, depending on the particular error command input.

With normal composing operation of the typewriter keyboard, the tape 12 is fed in its forward direction 24 by the paper punch feed mechanism and the appropriate date codes are punched on the tape corresponding to the selected keys being depressed by the operator. When an error occurs in the copy, or should the operator otherwise desire to delete or cancel the data which was just typed, either the "kill 1 word," "kill 2 words" or "kill line" key is depressed, depending on how far back on the copy the error occurred. Each of these keys applies a voltage to one of the error command inputs 30 of the correction control logic 28. Each of these voltages may be provided by simple switches actuated by keys 43, 44 and 45 and connected to an available voltage source at the keyboard. Upon the initiation of any of the error correction commands 30, the correction control logic 28 supplies an input signal on lead 76 which actuates the punch direction control circuit 80 to provide an output signal to the punch drive circuit 20 for changing the direction of the paper feed mechanism of the punch unit 14. Depending on which error command signal was initiated, the paper feed mechanism will move the tape back one word, two words or to the beginning of the line, at which time a zero-count signal will be generated by the appropriate zero detector 64, 66 or 68. On receipt of any of these zero-count signals, the correction control logic 28 will supply a further signal on lead 76 for reversing the paper feed drive mechanism to start the tape moving again in its forward direction. At the same time, the correction control logic 28 supplies a rubout code to the punch drive 20, via line 78, for causing the punch head to punch rubout codes over each of the data codes previously punched on the tape. This operation continues until the paper tape 12 has returned to the initial position at which the error correction command had originally been given. The punch and paper feed mechanism of the unit 14 is stopped at this point by the correction zero-count signal on line 92 which is fed to the correction control logic 28, which, in turn, provides a suitable signal on output lead 76 causing the punch drive 20 to stop the punch and paper feed while the rubout code signal on line 78 is removed. The operator may then continue his composing operation. If the correction command was "kill line," control logic 28 provides an output on line 82 which initiates a carriage return on the typewriter 16 and a space code is punched on the tape.

Figure 3:
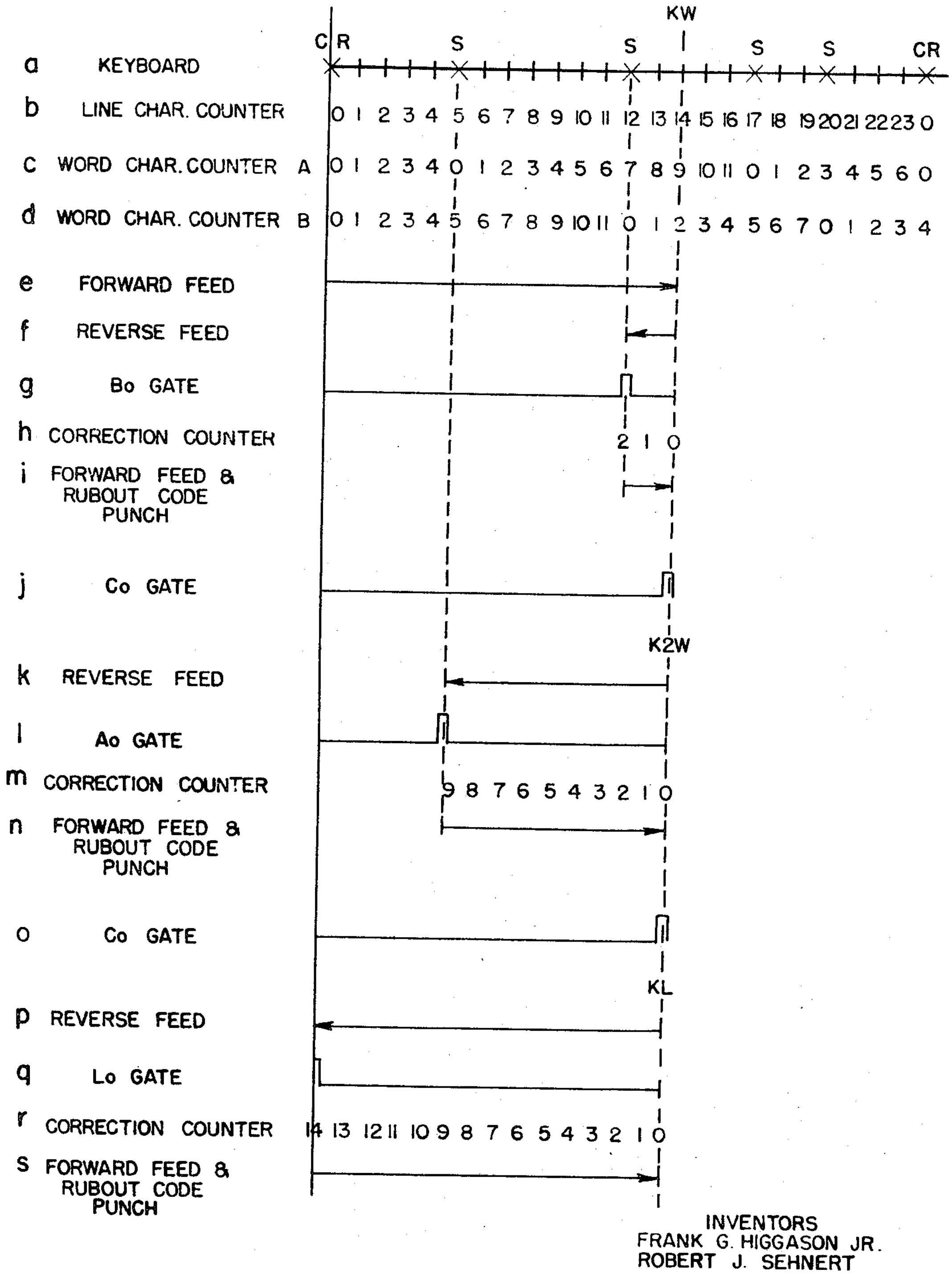
FIG. 3 is a timing diagram illustrating the general operation of the system of FIG. 1 to facilitate a better understanding thereof.

Referring now to FIG. 3, there is shown a timing diagram illustrating the operation of the system of FIG. 1 in each of the error correction modes. FIG. 3*a* illustrates the keyboard operation of a typical line being composed, beginning with a carriage return CR 102 resulting from the end of the last preceding line, and ending with a carriage return CR 104 at the end of the illustrated line, both being indicated by an "X" at the point in time, or the position along the copy, at which it occurred. Between the two carriage return marks 102 and 104 there are a number of individual characters, represented by the short vertical lines 106, and spaces S indicated by "X" marks 108 separating the characters 106 into words. The composed line of FIG. 3*a*, as illustrated, whether or not it contains any errors along its length, is punched on the forward moving paper tape 12. The carriage return CR indications are actually punched as space codes as previously mentioned, since the end of line designations for the typewriter would not necessarily correspond to the line lengths of the eventual printed copy, the latter being controlled by the printing apparatus which receives the coded input from the perforated tape 12. During the typing of this line, the line character counter 50 and the A and B word character counters 52 and 54 are reset to zero on the carriage return 102 by the CR reset signal on line 56 from the typewriter 16. These counters then begin counting each data code as it is punched in the tape.

In the illustrated example of FIG. 3*b*, the line character counter 50 contains a count of 23 on the last data code of the line, being then reset to zero on the subsequent carriage return 104. As shown in FIG. 3*c*, the A counter 52 counts the first four characters and then resets to zero on the first word space in response to the toggle reset signal on line 60. This counter then begins counting again from the next, or sixth, data code. Meanwhile, as shown in FIG. 3*d*, the B counter 54 counts the first four characters, but then continues counting through the first word space until it reaches the eleventh data code, corresponding to the last character of the second word from its previous reset. Since the next, or twelfth, data code is a word space, the toggle reset 58 responds to this code from the punch drive 20 and switches its reset output signal, via line 62, to the B counter 54. Consequently, the B counter 54 is reset to zero on the second word space, and the A counter continues counting through this word space until it reaches the next subsequent word space on the seventeenth data code. At this point the toggle reset 58 responds to the word space code from the punch drive 20 and switches its reset output signal back to the A counter 52, resetting the same to zero.

This sequence of operations continues until the carriage return 104 resets the line, A, and B counters. Thus, as can be seen from FIGS. 3*a*, 3*b*, 3*c* and 3*d*, for forward tape movement, the line character counter 52 will always contain the total data codes from the last carriage return, while the A and B word character counters 52 and 54 will alternately contain the total data codes of the last word and of the last two words at each word space along the tape.

Now, assume that an error occurred in the third word of the line, i.e., after the eleventh data code, and the operator presses the "kill 1 word" key 43 (FIG. 2) when the carriage and the tape are at the fourteenth data code, as represented in FIG. 3*a* by the dotted line KW. Up to this point the tape 12 had been fed in its forward direction, as indicated in FIG. 3*e*, while receiving the perforation code indicia corresponding to all of the data typed. On receipt of the kill word command signal, the correction control logic 28 (FIG. 1) resets the correction counter 34 via line 88, locks the keyboard, and actuates the punch direction control 80 which causes the punch unit 14 to feed the tape in its reverse direction, as shown in FIG. 3*f*, under the control of the punch drive 20. As the tape 12 is stepped backward through each data code interval, the correction counter 34 accumulates the total count, while the A and B word character counters 52 and 54 count backward. (The line character counter 50 also counts backward, but has no effect in this mode of operation.) The B counter 54 reaches zero at the last preceding word space, as shown in FIG. 3*d*, and thus a zero-count output pulse, shown in FIG. 3*g*, is generated by the zero detector 68, or B gate, which is fed to the control logic 28 via line 74. At this point the correction counter 34 contains a count of "2", as shown in FIG. 3*h*, corresponding to the two data code punch intervals through which the tape was reversely fed to reach the last word space. The control logic 28, upon receiving one zero-count pulse from either the A or B counter and being under the kill word command input, actuates the punch direction control 80 to initiate the punch unit 14 for forward feeding of the tape, while at the same time supplying a rubout code input to the punch drive 20, via line 78. The control logic 28 also actuates the typewriter drive 84 to type a slash on the hardcopy. The rubout code may typically be a 6 level perforation across the tape, so as to punch every bit space of the data code. Thus, each data code from and including the last word space has the rubout code punched thereover as the tape is stepped in its forward direction, as indicated in FIG. 3*l*. During this rubout operation, the correction counter 34 counts down to zero at the point at which the kill word command was initiated, as indicated in FIG. 3*h*, and the correction zero-count pulse, shown in FIG. 3*j*, is generated by the zero detector 90, or C*o* gate. This pulse is fed to the correction zero input of the control logic 28 and signifies that the rubout operation has been completed. The control logic 28 responds by removing the rubout code input to the punch drive 20, deactuating the punch direction control 80 to stop the tape feed of the punch unit 14 and unlocking the keyboard so that further data may be entered by the operator.

Referring again to FIG. 3*a*, and assume now that an error occurred in the second word of the line, i.e., after the fifth data code, and the operator presses the KILL 2 WORDS key 44 (FIG. 2) when the carriage and the tape are at the fourteenth data code, as represented in FIG. 3*k* by the dotted line K2W. As in the previous example, up to this point the tape 12 had been fed in its forward direction, as indicated in FIG. 3*e*, while receiving the code indicia perforations corresponding to all of the data typed. On receipt of the kill two words command signal, the correction control logic 28 resets the correction counter 34, locks the keyboard, and actuates the punch direction control 80 which causes the punch unit 14 to feed the tape in its reverse direction, as shown in FIG. 3*k*. As the tape 12 is stepped backward through each data code interval, the correction counter 34 again accumulates the total count, while the A and B word character counters 52 and 54 count down or backwards. The B counter 54 reaches zero at the last preceding word space, as shown in FIG. 3*d*, and thus a zero-count output pulse (FIG. 3*g*) is fed to the control logic 28 via line 74. However, since this circuit is under the kill two words command input, this first zero-count pulse is merely registered in the control logic 28, but it provides no output. The punch unit 14 continues to step the tape 12 backwards until the A counter 52 reaches zero on the fifth data code, as indicated in FIG. 3*c*. At this point the correction counter 34 contains a count of "9", as shown in FIG. 3*m*, corresponding to the nine data code punch intervals through which the tape was reversely fed to reach the next to the last or penultimate word space. The A counter, upon reaching zero, causes the zero detector 66, or $A_O$ gate, to generate a zero-count output pulse, shown in FIG. 3*l*, which is fed to the control logic 28 via line 72. The control logic 28 upon receiving this second zero-count pulse input, and being under the kill two words command input, actuates the punch direction control 80 to initiate the punch unit 14 for forward feeding of the tape, while at the same time supplying a rubout code input to the punch drive 20 via line 78. Again, the control logic actuates the typewriter drive 84 to type a slash on the hardcopy. Thus, each data code from and including the next to the last word space has the rubout code punched thereover as the tape is stepped in its forward direction, as indicated in FIG. 3*n*. During this rubout operation, the correction counter 34 counts down to zero at the point at which the kill two words command was initiated, and the correction zero-count pulse, shown in FIG. 3*o*, is generated by the zero detector 90, or $C_O$ gate. As before, this pulse is fed to the correction-zero input of the control logic 28 and signifies that the rubout operation has been completed so that the control logic 28 responds by removing the rubout code input to the punch drive 20, deactivating the punch direction control 80 to stop the tape feed, and unlocking the keyboard for further data input.

Assuming now that it is desired by the operator to cancel or delete the entire line, the KILL LINE key 45

(FIG. 2) is depressed, for example, on the fourteenth data code, shown in FIG. 3*p* as KL. On receipt of the kill line command signal, the correction control logic 28 resets the correction counter 34 to zero via line 88, locks the keyboard, and actuates the punch direction control 80 which causes the punch unit 14 to feed the tape in its reverse direction, as shown in FIG. 3*p*. As the tape 12 is stepped backward through each data code interval, the correction counter 34 accumulates the total count. In this mode of operation, the correction control logic 28 does not respond to the zero-count pulses produced by the A and B counters, but only responds to the zero-count produced by the line character counter 50. Since the line character counter 50 will reach zero at the last or preceding carriage return 102, the tape 12 will be stepped backwards to this point whereat the zero detector 64 will generate a zero-count pulse, shown in FIG. 3*q*, which is supplied to the correction control logic 28. At this point the correction counter 34 contains a count of "14," as shown in FIG. 3*r*, corresponding to the fourteen data code punch intervals through which the tape was reversely fed to reach the last carriage return. The control logic 28, upon receiving the zero-count pulse from the zero detector 64, and being under the kill line command input, actuates the punch direction control 80 to initiate the punch unit 14 for forward feeding of the tape, while at the same time, as before, supplying a rubout code input to the punch drive 20 as well as actuating the typewriter drive 84 to type a slash on the hardcopy. Consequently, each data code from and including the last carriage return (punched as a space code) has the rubout code punched thereover as the tape is stepped in its forward direction, indicated in FIG. 3*s*. During this rubout operation, the correction counter 34 counts down to zero at the point at which the kill line command was initiated. As before, the control logic 28 responds to the error correction zero-count on lead 92 by removing the rubout code input to the punch drive 20. However, in this mode of operation, the correction control logic 28 actuates the typewriter drive 84 to automatically generate a carriage return at the typewriter 16, resulting in a space code being punched on the tape. The punch direction control 80 is deactuated to stop any further tape feed of the punch unit 14 and the typewriter keyboard is unlocked. The system is now ready to accept a new line from the keyboard.

With respect to the auxiliary keys 36 providing, for example, the tape feed, EM, EN, EM leader, EN leader, thin, and stop functions, these keys actuate suitable switches to provide voltage inputs which are encoded by the encoder 100 for generating the appropriate TTS codes fed to the punch drive 20. The punch drive 20 will treat these codes in the same manner as the TTS codes supplied by the typewriter output encoder 19 and actuates the punch unit 14 to perforate the appropriate code indicia on the tape 12.

As previously mentioned, the computer control keys 38 provide a means of entering computer commands of up to some predetermined number of characters in length on the tape. Each of the computer control keys 38*a* through 38*i* may supply a selected input to a program encoder 102 for selecting a particular pre-wired program from the diode matrix of the encoder. The program encoder 102 may have any number of pre-wired programs therein, but in a particular construction of the apparatus in accordance with the present embodiment of the invention, the program encoder circuit 102 contains ten programs of eight characters each. Nine of the programs are each selected by an individual key, and one of the programs is selected by a combination of keys so that the nine computer control keys effectively control ten different programs. The ratio of available programs to the particular number of keys may of course be increased by employing further combinations of keys to select additional programs or, alternately, by employing a system wherein a particular key may be depressed a given plurality of times for selection of such additional programs.

Depression of any of the computer control keys also actuates a scanner 104 which scans the matrix of the program encoder 102 to gate out the TTS encoded program information on output line 106 which is then fed to the punch drive 20. A feed-back or "busy signal" is provided from the punch drive 20 to the scanner 104 via line 108 for inhibiting the scanner during each punch and tape feed operation. Thus, depression of a selected computer control key by the operator selects a particular one of the ten pre-wired programs of the program encoder 102 and actuates the scanner circuit 104 which begins its scan of the program encoder matrix. The first data or character of the encoder is scanned and its output is supplied in the form of a suitable TTS character code to the punch drive 20 via line 106. The punch drive 20 then causes the punch unit 14 to perforate the tape 12 with the appropriate TTS code indicia and to step the tape 12 to the next data code punch interval. During the punch perforation and feed, the busy signal on line 108 inhibits the scanner 104 from scanning the second character code, but on the completion of the tape feed, the busy signal is removed and the scanner switches to and gates out the second character code from the program encoder 102. As before, this TTS code is perforated onto the tape 12 and the tape is moved to its next data code position. The system continues to operate in this sequence until each of the characters of the program have been scanned, read or gated out, and punched onto the tape. In this manner, a multitude of program instruction words may be encoded and placed on perforated tape with a minimum number of control keys for operation at the keyboard. A particular apparatus construction in accordance with the present embodiment of the invention utilizes a scanner having an eight character capacity; however, a scanner of any other capacity may of course be employed, as desired.

Any suitable program encoder circuit, such as, for example, one of the diode matrix types, may be employed with any suitable scanner circuit. It is understood, of course, that the particular circuitry of these components as well as the other counters, logic, and control circuits previously mentioned, is within the ordinary skill of the art based on the teachings hereof.

Thus, there has been described an improved non-justifying tape perforating system having a rapid and readily operated error correction capability as well as a word program capability. At the same time, the system is relatively economical to manufacture since it utilizes the natural information content of the data, such as the word spaces, or the carriage return operation at the typewriter to control the amount of reverse tape movement for error correction or rubout rather than any additional markings, codes or indexes on the tape, or any timers for effecting reverse tape movement through predetermined lengths. Furthermore, the present system does not require a tape reader of any sort.

If desired, other correction functions may be added in a similar manner for killing three or more words, for example, by employing additional counters and a stepping reset. Also, if desired, a character kill function may be employed, if desired, wherein, upon depressing a suitable key, the perforation will step the tape backward only one code interval and punch a rubout code over the incorrect character code indicia.

Various modifications of the embodiment of the invention herein disclosed and described will, of course, be apparent to those skilled in the art; and as such, the scope of the invention should be defined only by the claims, and equivalents thereof.

Various features of the invention are set forth in the following claims.

We claim:

1. A system for placing coded intelligence on a record medium for use with marking means for placing coded indicia on the medium and means for moving the medium in at least one direction with respect to said marking means, said system comprising an operator controlled switching means for generating a signal corresponding to a predetermined word program, program encoding means responsive to said signal and establishing a pre-ordered data code sequence corresponding to the selected program, scanning means also responsive to said signal and coupled to said encoding means for sequentially gating each data code of the selected program from said encoding means in coded signal form, means responsive to said code signals or causing the marking means to place indica codes corresponding to said data codes in succession along the medium as it is fed in its forward direction, and means responsive to the operation of the marking means for inhibiting the operation of said scanning means during each marking operation so that each data code of the word program is gated and placed on the medium in said pre-ordered sequence.

References Cited

UNITED STATES PATENTS

| | | | |
|---|---|---|---|
| 2,852,076 | 9/1958 | Barbeau | 234—15 |
| 3,107,049 | 10/1963 | Jones | 234—15 |
| 3,219,806 | 11/1965 | O'Brien | 234—6 X |

JAMES M. MEISTER, Primary Examiner

UNITED STATES PATENT OFFICE
CERTIFICATE OF CORRECTION

Patent No. 3,664,577 Dated May 23, 1972

Inventor(s) Frank G. Higgason, Jr. & Robert J. Sehnert

It is certified that error appears in the above-identified patent and that said Letters Patent are hereby corrected as shown below:

Column 6, line 13 - "date" should be --data--.
Specification Page 14, line 10

Column 6, line 26 - "input" should be --output--.
Specification Page 14, line 23

Column 7, line 25 - "52" should follow "counter".
Specification Page 17, line 14

Column 8, line 5 - "31" should be --3i--
Specification Page 19, line 12

Signed and sealed this 9th day of January 1973.

(SEAL)
Attest:

EDWARD M.FLETCHER,JR.
Attesting Officer

ROBERT GOTTSCHALK
Commissioner of Patents